United States Patent [19]

Gupta et al.

[11] Patent Number: 5,710,881
[45] Date of Patent: Jan. 20, 1998

[54] DATA MERGING METHOD AND APPARATUS FOR SHARED MEMORY MULTIPROCESSING COMPUTER SYSTEMS

[75] Inventors: Rajiiv Gupta, Los Altos; Alan H. Karp, Sunnyvale, both of Calif.

[73] Assignee: Hewlett Packard Company, Palo Alto, Calif.

[21] Appl. No.: 755,686

[22] Filed: Nov. 25, 1996

Related U.S. Application Data

[63] Continuation of Ser. No. 149,418, Nov. 9, 1993, abandoned.

[51] Int. Cl.$^6$ .................................................. G06F 12/00
[52] U.S. Cl. .......................... 395/200.3; 395/200.3; 395/200.43; 395/200.44; 395/523; 395/474
[58] Field of Search .......................... 395/427, 200.3, 395/200.43, 200.44, 523, 474

[56] References Cited

U.S. PATENT DOCUMENTS

| | | | |
|---|---|---|---|
| 4,141,067 | 2/1979 | McLagan | 364/200 |
| 4,520,439 | 5/1985 | Liepa | 364/200 |
| 4,779,189 | 10/1988 | Legvold et al. | 364/200 |
| 4,875,155 | 10/1989 | Iskiyan et al. | 364/200 |
| 5,129,060 | 7/1992 | Pfeiffer et al. | 395/166 |
| 5,241,641 | 8/1993 | Iwasa et al. | 395/425 |
| 5,291,442 | 3/1994 | Emma et al. | 395/425 |
| 5,388,222 | 2/1995 | Chisuin et al. | 395/275 |
| 5,423,019 | 6/1995 | Lin | 395/425 |
| 5,488,709 | 1/1996 | Chan | 395/445 |
| 5,491,811 | 2/1996 | Arimilli et al. | 395/471 |
| 5,526,482 | 6/1996 | Stallmo et al. | 395/182.04 |
| 5,553,307 | 9/1996 | Fujii et al. | 395/845 |
| 5,617,530 | 4/1997 | Stallmo et al. | 395/182.04 |

FOREIGN PATENT DOCUMENTS

| | | | |
|---|---|---|---|
| 0 328 172 | 8/1989 | European Pat. Off. | G06F 12/08 |
| 0 397 994 | 11/1990 | European Pat. Off. | G06F 12/08 |
| 0 397 995 | 11/1990 | European Pat. Off. | G06F 12/08 |
| 91/03785 | 3/1991 | WIPO | G06F 12/08 |

OTHER PUBLICATIONS

Karp et al., "Data Merging for Shared Memory Multiprocessors", HP Laboratories Technical Report, Nov., 1992, pp. 1–21.

*Primary Examiner*—Jack B. Harvey
*Assistant Examiner*—Valerie Darbe

[57] ABSTRACT

In a shared memory multiprocessing computer system, multiple processors can cache copies of a shared data block in their local cache memories and independently modify their cached copies. The cached copies are later merged in a global memory with the shared data block. With each cached copy, a bitmask consisting of a plurality of flags associated with elements of the cached copy also is stored in the local memories. A local memory controller tracks which elements of the cached copies are modified by setting the bitmask flags associated with such elements. When merging, only modified elements of the cached copies are stored in the originating data block as indicated by the bitmask flags.

19 Claims, 6 Drawing Sheets

DATA MERGING METHOD AND APPARATUS FOR SHARED MEMORY MULTIPROCESSING COMPUTER SYSTEMS

This is a continuation of application Ser. No. 08/149,418 filed on Nov. 9, 1993, now abandoned.

FIELD OF THE INVENTION

This invention relates generally to computer systems in which data stored in a memory is globally shared among multiple processors, and more particularly relates to methods and apparatus for maintaining coherence of shared data cached at individual processors.

BACKGROUND AND SUMMARY OF THE INVENTION

In multiprocessing computer systems, multiple independent processors are interconnected to permit simultaneous execution of multiple processes which constitute parts of a single program. Such computer systems also can be used to execute multiple separate programs which share data or memory resources.

Shared memory multiprocessing systems, in which data is stored in a memory that is globally accessible by all processors, offer the advantage of a flat memory model preferred by many programmers. In systems with a flat memory model, data can be accessed by individual processors using global virtual addressing. By contrast, in some distributed memory multiprocessing systems, data is stored in memories that are accessible only by individual processors. In such systems, a processor can only access data in another processor's memory by communicating directly with a program running on the other processor. The programmer's task is consequently more complex because provision must be made to exchange messages between processors and to track the location of data among the processors.

In many shared memory multiprocessing systems, each processor is provided with a local memory or cache for faster memory access. Because the global memory and processors are physically remote, direct access to data in global memory is comparatively slow. The cache provides a faster intermediate memory level for temporary storage of shared data required by a processor. When the processor accesses data from a data block of the global memory, the entire data block is transmitted and stored into the processor's cache. The initial data access is still slow since the block must be obtained from the global memory, but subsequent accesses to the same data block will be made at the faster rate of the cache. Most data accesses by a processor are temporally and spatially localized. That is, in a given time period, a majority of data accesses by a processor will be to the same data block. Accordingly, with caching, data is accessed at a much faster average rate than if all data accesses were made directly to the global memory.

Shared memory multiprocessing systems which employ caches, however, must account for a further problem, that of maintaining cache coherence. When multiple processors have copies of the same data block and the cached copies are modified by one or more of the processors, the cached data blocks will be inconsistent. This can cause erroneous results from the processors' execution of their respective processes.

Lack of cache coherence occurs, for example, when two processors have copies of the same data block in their respective caches and both modify the same data element in the blocks. In such a situation, the processor's cached copies are inconsistent with each other and with the global memory data block. Depending on which processor's copy updates the global memory last, the data element in the global memory data block will have the value written by one processor or the other (and not necessarily the value actually written last by the processors). This is sometimes termed a write/write data race.

Lack of cache coherence also results when a first processor writes and a second processor reads a same data element of a data block. Depending on whether the second processor's cached copy of the data block is obtained before or after the data block in global memory is updated with the first processor's written value, the second processor will read the data element's original value or the value written by the first processor. This is sometimes termed a read/write data race.

The problem of cache coherency has been widely studied and a number of solutions are available. A number of these solutions operate by enforcing sequential consistency. One such solution is to simply bypass the caching of shared data. Each access to a data element that is shared with other processors is made directly to global memory. In this manner, the processors access shared data in a strictly sequential manner. This solution imposes severe speed penalties in systems where direct global memory accesses are much slower than cached data accessing, or there is a large amount of shared data.

Another variation of sequential consistency, which we refer to as invalidate on write, is to permit simultaneous caching of a data block by multiple processors, but require any processor writing to the data block to send an invalidate signal to all other processors in the system. The other processors, on receiving the invalidate signal, must acquire an updated version of the data block from the global memory before further accessing the data block. A further variation of sequential consistency, which we refer to as update on write, requires the writing processor to send its modifications of the data block to the other processors in the system each time a write is performed.

Both the invalidate on write and update on write schemes, however, are less than efficient. Under both schemes, invalidating or updating messages are sent unnecessarily when data blocks are falsely shared. In the situation we refer to as false sharing, more than one processor caches the same data block, but a data element modified by a writing processor is not accessed (read or written) by any other processor (i.e. the data block is shared, but the data element is not). As long as no processor accesses a data element modified by another processor, no conflict is created. Since false sharing can account for a large share of invalidating and updating messages, these schemes result in an excess of unnecessary communications traffic.

The performance impact of false sharing can be lessened with cache coherency solutions that allow processors to temporarily maintain inconsistent cached copies of a data block. The inconsistent cached copies are later reconciled (i.e. updates are propagated) at programmed synchronization points. (Synchronization points can be set, for example, through the use of appropriate synchronization operations such as lock and barrier operations placed in the program.) These synchronizations must be properly programmed to avoid the above described write/write and read/write data races. However, between synchronizations, multiple processors can modify different portions of the same data block in their respective caches. This type of solution, which we term delayed consistency, reduces the communications traffic associated with false sharing.

One delayed consistency solution is proposed by A. Karp and V. Sarkar in "Data Merging for Shared Memory Multiprocessors," HP Laboratories Technical Report, November, 1992. With Karp-Sarkar data merging, more than one processor is allowed to store a copy of a global memory data block in its cache and independently modify separate portions of its respective cached copy. Each cached copy is later transmitted back to the global memory and merged with the data block.

The merging of the cached copies and the global memory data block is carried out with use of a bitmask containing a one bit flag for each byte of the global memory data block. Each flag in the bitmask indicates whether an associated byte of the global memory data block has been modified in a merge. The bitmask, with the flags initially cleared, is assigned to the global memory data block when the block is first cached by any processor. A cached copy which has been modified by a processor, then flushed from the processor's cache (so as to permit its replacement with a copy of another data block for example), is transmitted back to the global memory to be merged with the originating global memory data block.

Each modified cached copy is merged with the originating data block by comparing, for each flag in the bitmask that is not yet set, the associated byte of the originating data block and the byte in a corresponding position of the cached copy. If the bytes differ, the byte in the cached copy has been modified. The modified cached byte is therefore stored in place of the byte in the originating data block. The flag associated with this byte also is set to indicate it has been modified. However, if the bytes are identical, the flag remains cleared and the unmodified cached byte is not stored in the global memory data block.

Accordingly, two or more cached copies of the data block having separate modified portions can be merged in the global memory.

The Karp-Sarkar data merging system also maintains a counter for each global memory data block which tracks the number of processors having copies of the block in their caches. The counter is incremented for each processor caching a copy of the block. The processors notify the global memory whenever a copy of the data block is flushed from their caches, even when it has not been modified, so that the counter can be decremented. By tracking this number, the data block's bitmask can be re-initialized when the number of processors having copies of the data block returns to zero.

One drawback of the Karp-Sarkar data merging approach is that once a modified cached copy has been merged with a global memory data block, no processor can be allowed to cache another copy of the block until merging is complete (i.e., all cached copies of the block are merged). To prevent such further caching of the block after merging begins, a suspend mechanism is provided. A suspend bit is associated with the global memory data block. When a cached copy is first merged with the block and another copy of the block remains cached, the suspend bit is set. While the suspend bit is set, any request to access the block is placed in a suspend queue. The requests remain suspended until the merge is complete (i.e. the count of processors having cached copies is reduced to zero), whereupon the requests are serviced and the bit cleared.

Preventing further access to a global memory data block after merging begins is necessary in the Karp-Sarkar data merging approach because a processor may properly modify a particular byte of a global memory data block several times between synchronization points in accordance with its program without creating a data race. Between such modifications, the processor's cached copy of the block may be flushed from the cache so that the cache can be used to store copies of other blocks. However, once the modified cached copy is flushed, it is merged with the global memory block and the flag associated with the modified byte will be set. If the processor is allowed to again cache a copy of the block and modify the byte, it cannot again be properly merged with the global memory data block. (The further modification of the byte won't be stored in the global memory because the data bit is already set.) The suspend mechanism allows the processor to again cache and modify the same byte before the next synchronization, but only after merging is complete and the flag associated with the byte is cleared.

The present invention provides a data merging method and apparatus which corrects this drawback of Karp-Sarkar type data merging (i.e. the requirement that requests for access to a data block be suspended once merging of the data blocks begins is eliminated). According to the present invention, data merging is accomplished by associating a bitmask with each cached copy of an originating data block. The bitmask comprises a plurality of flags, one for each data element in the cached copy to indicate which cached copy data elements have been modified. The bitmask flags are initialized when the copy is first cached. Then, as data elements of the cached copy are modified, their associated flags are set to a written value.

When the cached copy is thereafter flushed from the cache, the bitmask determines which data elements of the cached copy are stored in the global memory data block. Each cached copy data element, whose associated flag indicates it has been modified, is stored in the global memory data block. Accordingly, during merging, data elements of the cached copy are stored in corresponding positions of the originating data block when the cached copy data elements are modified, and not when the originating data block elements remain unmodified. With such a scheme, a processor can successfully cache a copy of a global memory block, have it merged, and again cache a copy of the block without waiting for the merger to complete.

In one embodiment of the invention, the cached copy data elements associated with the bitmask flags are bytes. (The term "byte" is used herein to signify a multi-bit data element, generally, but not necessarily, having seven or eight binary digits ("bits").) In a further embodiment of the invention, the cached copy data elements associated with the bitmask flags are data words. (The term "data word" is used herein to signify a unit of data which consists of an integer number of bytes, generally, but not necessarily four bytes.) By maintaining a bitmask having flags associated only with words of the cached copies, less storage in the processor caches is required for storing the bitmasks.

In accordance with another aspect of the invention, in an embodiment of the invention wherein the bitmask flags are associated with cached copy data words, a subword store flag also is associated with the cached copy. The subword store flag is initialized when the copy is cached and subsequently set when the processor performs a subword store operation on the cached copy (i.e. an operation which stores less than an entire word). The cached copy is then merged using a bitmask having a flag for each byte of the global memory data block as in the Karp-Sarkar data merging approach. The global memory bitmask can be stored in dynamically allocated memory. This aspect of the invention reduces cache storage overhead while permitting subword memory accesses.

According to yet another aspect of the invention, a read bitmask and a write bitmask are maintained in the cache. Each of the read and write bitmasks contains a flag for each cached copy data element which is set when the associated data element is read and written, respectively. After the cached copy is merged with the global memory data block, the bitmasks are retained so that the occurrence of a read/write or write/write data race can be identified for debugging or other purposes.

According to a further aspect of the invention, a lock flag is associated with each global memory data block. The lock flag is set at the request of a locking processor. When the lock flag is set, further requests for access to the data block are placed in a suspended request queue. The lock flag can only by cleared on the locking processor's request, whereupon the suspended requests are processed.

According to yet a further aspect of the invention, reduction operations are performed on data in the global memory. Such reduction operations on global memory data can be performed by a global memory controller.

According to still another aspect of the invention, a copy of a data block stored in a first global memory is also stored into a second global memory in a computer system having multiple global memory units. Processors can then obtain cached copies of the data block from either global memory unit. When all cached copies have again been merged with the global memory copies of the data block, the global memory copies also are merged. Preferably, the multiple global memory units are arranged in a hierarchy and the global memory copies merged in a next higher level of the global memory. This aspect can be applied when the data block of one global memory is being accessed by a large number of processors to avoid tying up that global memory while leaving others idle.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
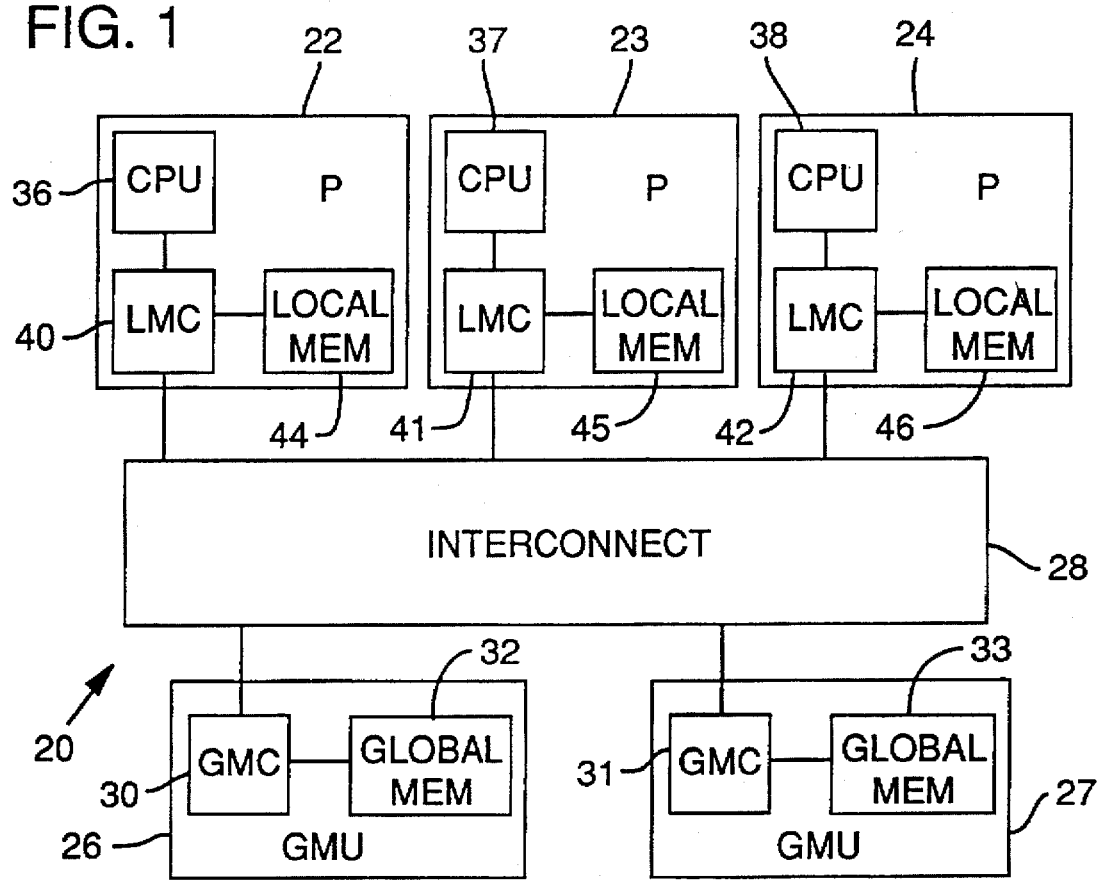
FIG. 1 is a schematic diagram of a shared memory multiprocessing computer system according to the present invention.

With reference to FIG. 1, in a first embodiment of the present invention, a shared memory multiprocessing computer system 20 comprises a plurality of processors 22–24 and one or more global memory units 26, 27. An interconnecting communications medium 28 such as a bus, crossbar switch, multistage network, local area network, or the like interconnects the processors 22–24 and the global memory units 26, 27. The communications medium 28 is used to transfer data between the processors 22–24 and the global memory units 26, 27.

Each global memory unit 26, 27 has a global memory controller 30, 31, and a global memory 32, 33. The global memories 32, 33 provide storage for data which is to be shared by the processors 22–24, and may also store data related to data merging. The global memory controllers 30, 31 respond to global memory requests from processors, and perform data merging operations. The global memory controllers 30, 31 can be implemented as a state machine. However, the controllers 30, 31 preferably are implemented with general purpose processing circuits programmed to operate according to the invention.

Each of the processors 22–24 has a central processing unit 36–38, a local memory controller 40–42, and a local or cache memory 44–46. The processors 22–24 individually execute processes in their respective central processing units 36–38 which may form parts of a common programmed task. When a process being executed in a processor's central processing unit 36–38 requires access to shared data stored in one of the global memory units 26, 27, the processor's local memory controller 40–42 issues a data request to that global memory unit. Data received by one of the processors 22–24 from the global memory units 26, 27 is stored in its local memory 44–46.

The shared data stored in the global memories 32, 33 comprises a plurality of data blocks, each data block generally consisting of a number of bytes. To reduce the average time required to access shared data, the processors 22–24 are allowed to cache copies of the shared data blocks in their local memories 44–46. Preferably, the local memories 44–46 are random access, semi-conductor type memories which can provide fast access times commensurate with the instruction execution speed of the central processing units 36–38. The global memory modules 32, 33 also can be relatively fast, semi-conductor type memories, but can include slower bulk storage devices such as optical or magnetic media data storage devices. Accordingly, when a central processing unit 36–38 of a processor 22–24 requires access to shared data in a global memory unit 26, 27, the processor's local memory controller 40–42 issues a data request to the global memory unit. The global memory controller 30, 31 in the global memory unit responds by transmitting a copy of the data block containing the requested data to the processor. The processor's local memory controller 40–42 then stores the data block copy in the processor's local memory 44–46.

In the computer system 20, more than one processor 22–24 can cache copies of a same global memory data block in their local memories 44–46 and independently modify portions of such copies. As a result of independently modifying the cached copies, the copies may differ. These differences between cached copies are resolved by data merging as described below.

Since copies of a shared data block can be cached and modified by multiple processors in the computer system 20, read/write and write/write data races can be created. These races are prevented in the computer system 20 by programming the processes running on the processors 22–24 with proper synchronization. To avoid write/write data races, the processes must be properly programmed so that no two processors modify a same data element between programmed synchronization points. Also, the programmer should ensure that no processor reads a data element of the shared block which is also modified (i.e. written) by another processor between programmed synchronization points. Thus, more than one processor modifying a same shared data element between synchronizations occurs in the computer system 20 only as a result of programmer error. Synchronization of accesses to a shared data element can be done, for example, with conventional lock or barrier instructions and other related mechanisms.

Figure 2:
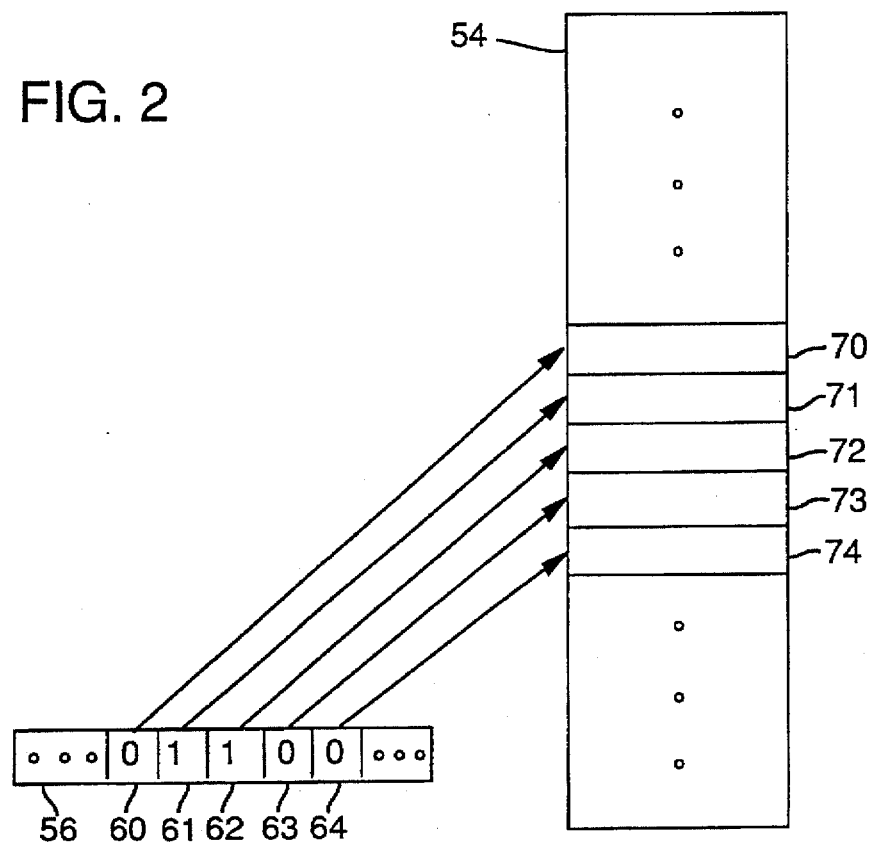
FIG. 2 is a diagram showing the relationship between flags in a write bitmask and data elements of a cached data block stored in a local memory of the computer system of FIG. 1 according to a first embodiment of the invention.

Referring to FIG. 2, according to the first embodiment of the invention, data merging is accomplished by keeping track of which data elements of a cached copy have been modified. In the computer system 20, when the local memory controller 40 (FIG. 1) stores a copy 54 of a data block (the "originating data block") from the global memory unit 26 into the local memory 44, the controller also stores a write bitmask 56 in the local memory. The write bitmask 56 consists of a plurality of flags 60–64, one for each of a plurality of data elements 70–74 in the copy 54. The flags 60–64 are associated in a one-to-one relationship to the data elements 70–74 as illustrated by the arrows in FIG. 2. In the embodiment illustrated in FIG. 2, each flag is a single bit, but can comprise multiple bits in alternative embodiments. Also in the illustrated embodiment, the data elements associated one-to-one with the bitmask flags are bytes. However, as shown in the embodiment illustrated in FIG. 3 and described below, the data elements associated one-to-one with the bitmask flags can be words or any other sized data units which together form the cached copy.

The local memory controller 40 tracks whether data elements 70–74 of the cached copy 54 have been modified by setting the flags 60–64 associated with the data elements that are modified. The local memory controller 40 initially sets the flags 60–64 to a not written value (i.e. a value indicative of their associated data elements 70–74 not having been modified). In the illustrated embodiment, the not written value of the single bit flags 60–64 is zero. When the central processing unit 36 later modifies any of the data elements 70–74, the local memory controller 40 sets the flags associated with such modified data elements to a modified value (e.g. a one in the illustrated embodiment). For example, if the central processing unit 36 modifies the data elements 71 and 72 by writing to these elements, the associated flags 61, 62, respectively, are set to one. As a result, the bitmask flags 60–64 indicate which of the cached copy data elements 70–74 have been modified.

When the cached copy 54 is flushed from the local memory, the local memory controller 40 transmits the bitmask 56 and cached copy 54 to the global memory unit 26. Flushing of the cached copy 54 occurs, for example, when the local memory controller 40 replaces the cached copy with another data block copy so that the central processing unit 36 can access data in the other data block copy. Some synchronization mechanisms can also trigger flushing of the cached copy 54 by sending an invalidate signal to the local memory controller 40. Also, in some embodiments, the local memory controller 40 transmits only as much information as is necessary for the data merging to thereby reduce communications overhead, e.g. the controller transmits the bitmask 56 and only those data elements of the cached copy 54 that have been modified.

In the global memory unit 26, the global memory controller 30 (FIG. 1) uses the bitmask 56 in merging the cached copy 54 with its originating data block. For each of the flags 60–64 in the bitmask 54 which is set to the modified value, the global memory controller 30 stores the associated data element 70–74 of the cached copy into the originating data block. For example, since the flags 61, 62 in the illustration of FIG. 2 are set to one (i.e. the modified value), the associated data elements 71, 72 are stored in corresponding positions of the originating data block. This effects consistent merger in the global memory data block of multiple cached copies since only the modified portions of the cached copies update the data block and programming constraints prohibit more than one processor from modifying the same portions of the data block.

As described above in the background of the invention, one drawback of the prior Karp-Sarkar data merging approach is that a processor is prevented from modifying an element of a cached data block, merging the block, and again caching the data block before all copies of the block have been merged. This is because the processor might again modify the same element in the data block, and such further modification would not be stored in global memory with Karp-Sarkar type data merging. In Karp-Sarkar data merging, a bitmask in the global memory tracks which elements of the global block are modified. Elements of a cached copy are stored only if they differ from an as yet unmodified element in a corresponding position of the global block. More specifically, a processor's modification of a data element in its first cached copy of a data block updates the element in a corresponding position of the global block and sets an associated flag. Once the flag is set, no further modification to the element can update the global block until all cached copies of the block are merged and the flag is reset. For this reason, the Karp-Sarkar data merging system employs a suspend mechanism which prevents any processor from caching the data block after it is first merged, until all previously cached copies of the block also have been merged.

Multiple modifications of a data element by a same processor between synchronizations, however, is permissible in systems employing delayed consistency. Only modification of a same data element by more than one processor is considered as error. The Karp-Sarkar data merging approach, then, imposes an undesirable, arbitrarily long delay on processors that must again modify a same element of a data block after having flushed their first cached copy of the block.

In the data merging approach of the present invention, a processor may cache and modify a data block any number of times. All modified elements of a cached copy are always stored. Therefore, it is not necessary to prevent processors from further caching copies of a data block after merging begins but before it is complete. Consequently, no suspend mechanism is required.

Figure 3:
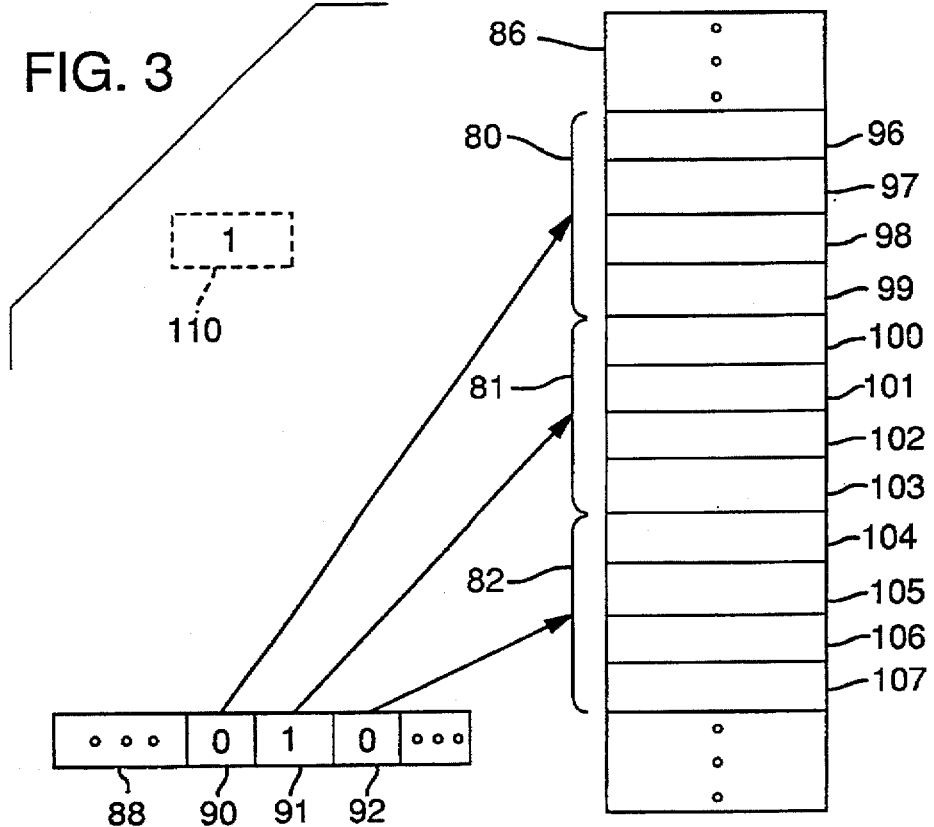
FIG. 3 is a diagram showing the relationship of write bitmask flags to data elements of a cached data block stored in the local memory of the computer system of FIG. 1 according to second, third and ninth embodiments of the invention.

With reference to FIG. 3, according to a second embodiment of the invention, the local memory controllers 40–42 in the computer system 20 track which words 80–82 of a cached copy 86 are modified using a "word" write bitmask 88 having flags 90–92 associated in a one-to-one relationship with the words 80–82. Each word 80–82 consists of an integer number of bytes 96–107 (e.g. four bytes per word in the embodiment illustrated in FIG. 3). To track which words are modified, the flags 90–92 are initially set to a not written value. Then, when words 80–82 in the cached copy 86 are modified, their associated flags 90–92, respectively, are set to a written value. For example, as illustrated in FIG. 3, with the flags 90–92 initially set to zero, the flag 91 is set to one when the word 81 is modified, indicating it has been modified.

By associating the flags 90–92 with words of the cached copy, the storage overhead associated with tracking modifications to the cached copy is reduced in the second embodiment. By comparison, the first embodiment shown in FIG. 2 in which a bitmask flag for each byte of the cached copy is maintained requires approximately four times more storage for the bitmask flags. Maintaining a flag per word is particularly advantageous where the central processing units 36–38 access data in word sized increments. With such central processing units, which are now quite common, tracking which bytes 96–107 are modified in the cached copy 86 with a flag per byte in the bitmask 88 is redundant.

Referring still to FIG. 3, in an alternative ("third") embodiment of the invention which maintains a word write bitmask 88, a subword store flag 110 also is associated with the cached copy 86 to accommodate subword store operations. Some central processing units 36–38 which normally access data by the word, also are capable of performing operations (hereafter "subword store operations") that modify data in increments of less than a word (e.g. that modify only a byte at a time). In a computer system 20 employing such central processing units, it is desirable to normally perform data merging at the word level to reduce storage and transmission overhead, yet provide for byte level data merging when subword store operations are used.

Accordingly, when the cached copy 86 is stored in the local memory 44, the local memory controller 40 also stores the subword store flag 110 in the local memory 44. When stored, the flag 110 is initially set to a "no subword stores occurred" value indicative of no subword store operations having been performed on the cached copy 86. At such time as the central processing unit performs a subword store operation, the local memory controller 40 sets the subword store flag to a "subword store occurred" value indicative of such occurrence. The controller 40 also sets the word write bitmask flag associated with the word modified by the subword store operation to the written value. In the illustrated embodiment, the subword store flag is a single bit, the no subword stores occurred value is a zero, and the subword store occurred value is a one. For example, if the central processing unit 36 performs a subword store operation which writes data in the byte 102, which is part of the word 81, the local memory controller sets the subword store flag 110 to one, and also sets the write bitmask flag 91 associated with the word 81 to one. The state of the word bitmask and subword store flags after a subword store operation modifies the byte 102 is illustrated in FIG. 3.

When the cached copy 86 is subsequently flushed from the local memory 44, the local memory controller 40 transmits the cached copy 86, cached copy write bitmask 88, and subword store flag 110 to the global memory unit 26 where the originating data block 118 is stored. If the subword store flag 110 is set to the no subword store occurred value, the cached copy 86 is merged with the originating data block 118 by storing each word 80–82 whose associated flag 90–92 in the word write bitmask 88 is set to the written value at corresponding positions in the originating data block. However, if the subword store flag 110 is set to the subword store occurred value, only the modified bytes of the cached copy 86 are merged.

To merge only the modified bytes, the global memory controller 30 stores a subword write bitmask in the global memory consisting generally of a flag for each byte of the originating data block, with each flag initially set to the not written value. For each word 80–82 of the cached copy 86 whose associated word write bitmask flag 90–92 is set to the written value, the global memory controller 30 compares the bytes of such word with bytes in corresponding positions of the originating data block. If the bytes differ and the subword write bitmask flag associated with originating block byte is still set to the not written value, the global memory controller 30 stores the cached copy byte in place of the originating data block byte and sets the flag in the global write bitmask associated with the originating data block byte to the written value. Additional copies of the data block cached in other processors 23–24 are subsequently merged in a like manner.

Figure 4:
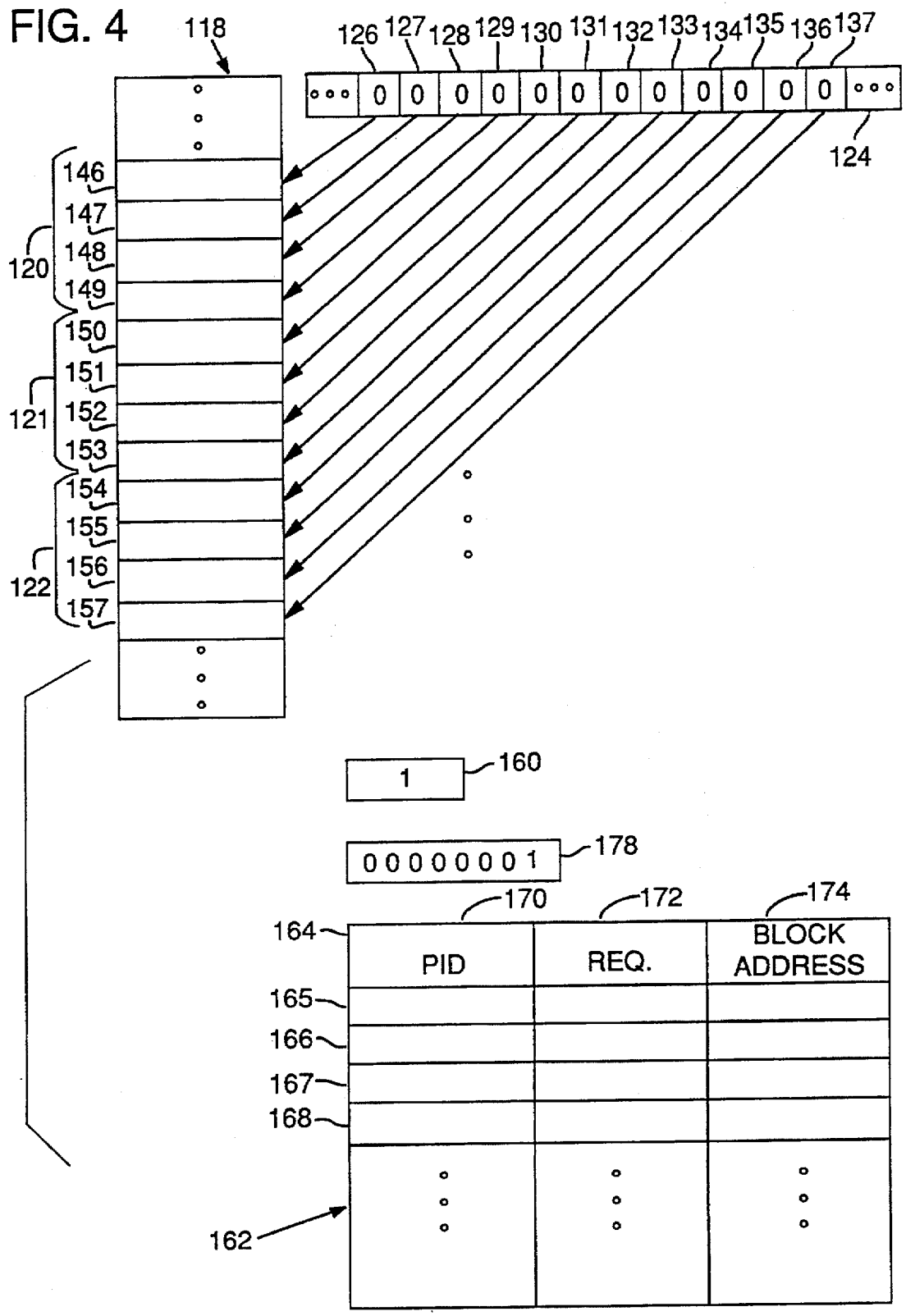
FIG. 4 is a diagram showing a global write bitmask, suspend/lock flag, suspend queue, and count associated with a data block and stored in a global memory of the computer system of FIG. 1 according to third and fourth embodiments of the invention.

For example, as illustrated in FIG. 4, an originating data block 118 of the cached copy 86 (FIG. 3) comprises words 120–122 at positions corresponding to those of the words 80–82 (FIG. 3). When the subword store flag 110 (FIG. 3) is set to one indicating a subword store operation was performed on the copy 86, the copy 86 and block 118 are merged using a global write bitmask 124. The bitmask 124 comprises a flag 126–137 for each byte 146–157 of the block 118. Merger is effected by comparing the bytes 100–103 (FIG. 3) of each modified cached copy word 81 (indicated by the associated flag 91 being set to one) to those bytes 150–153 in corresponding positions of the block 118 whose associated flags 130–133 are still set to zero (indicating they are not yet modified). The bytes 100–103 which differ from bytes 150–153 whose associated flags 130–133 are set to zero are stored and the associated flags set to one.

Preferably, the global memory controller 30 dynamically allocates storage space for the subword write bitmask out of a free memory portion of the global memory. This serves to minimize storage overhead since a subword write bitmask for a data block is only stored in the global memory when required for data merging.

With this type of subword data merging, a modified byte in a cached copy is only stored into the global memory if the originating data block byte having a corresponding position has not previously been modified. For this reason, the same processor must be prevented from again caching a copy of the block and again modifying the same byte until merger is complete. Preferably, processors are prevented from again caching a data block after subword data merging of the block has begun by suspending any further data requests for the block until the merge is complete.

Referring also to FIG. 4, to provide for suspending data requests, the global memory controller 30 stores a suspend flag 160 for each data block 118 in the global memory. Initially, the suspend flag 160 is set to a not suspended value, which in an embodiment of the invention employing a one bit suspend flag is preferably zero. When subword data merging of the data block 118 begins, its associated suspend flag 160 is set to a suspended value, preferably a one. If the suspend flag 160 is set to the suspended value when a data request is received, the global memory controller 30 stores the request in a suspend queue 162. The suspend queue 162 is a list of suspended requests 164–168 which is stored in the global memory 32. For example, as illustrated in FIG. 4, the stored, suspended request 164 may comprise a processor identifier 170, a request type identifier 172, and block address 174. Other formats for storing suspended requests 164–168 also can be used. When the suspend flag 160 is later reset to the not suspended value after subword data merging is complete, the global memory controller 30 services the suspended requests 164–168 stored in the queue, preferably in a first-in, first-out order (i.e. in the order received).

To determine when merging is complete, it is necessary to track how many copies of the data block 118 have been cached. Preferably, the global memory controller 30 stores a count 178 for each data block 118 in the global memory 32 to track this number. Initially, the global memory controller 30 sets each count to zero. Then, each time the global memory controller 30 transmits a copy of the data block 118 to a processor, the controller increments the count 178. Each time a copy is again merged with the block 118, the global memory controller 30 decrements the count 178 associated with the block. Also, if a cached copy is flushed from a processor's local memory without having been modified, the processor's local memory controller notifies the global memory controller so that it can decrement the count 178. In this manner, the count 178 of the number of outstanding cached copies of a data block is accurately maintained. When the count 178 is decremented back to zero, the global memory controller 30 determines that merger is complete and services the suspended data requests for this data block if any.

Referring to FIGS. 1, 3 and 4, in a fourth embodiment of the invention, the suspend flag 160, suspend queue 162, and count 178 also are used as a "lock" which allows a processor to obtain exclusive access to a data block. Such locks are useful for synchronizing memory accesses and for other purposes. To obtain exclusive access to the global memory data block 118, a locking processor (for example, the processor 22) transmits a lock request to the global memory unit 26 where the data block 118 is stored. If the count 178 for the block 118 is zero, the global memory controller 30 in the global memory unit 26 sets the suspend flag 160 (which also serves as a "lock" flag) for the block to a locked value, may transmit a copy of the data block to the locking processor 22 for caching, and increments the count to one. For embodiments having a one bit suspend/lock flag 160 such as that illustrated in FIG. 4, the locked value can be a one and an initial unlocked value can be a zero. Setting the suspend/lock flag 160 prevents all other processors from caching a copy of the data block 118 until the processor 22 releases the lock. Data and lock requests for the block 118 by other processors 23, 24 while the suspend/lock flag 160 is set to the locked value are placed in the suspend queue 162.

If, however, the count 178 for the block 118 is non-zero when the locking processor 22 transmits the lock request, another processor already has a cached copy of the data block. Therefore, the locking processor 22 cannot be granted exclusive access to the data block 118 until all outstanding cached copies have been merged with the data block, returning the count 178 to zero. Preferably, in such instances, the global memory controller 30 responds to the lock request by setting the suspend/lock flag 160 and storing the lock request first in the suspend queue 162. This prevents further caching of copies of the block 118 and minimizes the delay in servicing the lock request. Once the outstanding cached copies of the block 118 have been merged, the count 178 returns to zero and the lock request can be serviced.

Release of the lock occurs when the locking processor 22 explicitly releases the lock by notifying the global memory unit 26. In response, the global memory controller 30 resets the suspend/lock flag 160 to the unlocked value.

While the data block 118 is locked, any data requests by other processors for the block are suspended, i.e. stored in the suspend queue for later servicing. As soon as the lock is released, the requests are serviced in order by the global memory controller. By suspending data requests, the lock operates similarly to accessing a slow memory. The processor transmits a data request to the memory, and the requested data is returned as soon as it is available.

Suspending data requests while a data block is locked also has the advantage of avoiding "spin-locks" that programmers use with other types of locks. Spin-locks are a programmed procedure in a process which continually tests the status of a lock until the lock is freed, and the process can continue. Spin-locks are commonly employed in processes which cannot proceed without access to particular data that may be locked. This continual testing of a lock's status, however, generates considerable communications traffic between a processor executing the process and global memory, and also ties up the processor's central processing unit. The same functionality as a spin-lock is provided without the communications traffic and central processing unit overhead by the suspending of data requests utilizing the suspend queue in the lock of the present invention.

Further, with this lock, processors 22–24 with suspended data requests may be prevented from idling until the lock is released by the global memory controllers 26, 27 notifying the processor when suspending its data request. In some cases, processes may have some lower priority tasks which can be performed while awaiting the release of locked data required for a higher priority task. By notifying the processor of the suspension of its data request, the process executing on the processor may perform other useful work not requiring the requested data.

Yet another advantage to the lock according to this embodiment of the present invention is that, since all functions of the lock are performed by the global memory units 26, 27, no modifications need be made to the processors 22–24.

Figure 5:
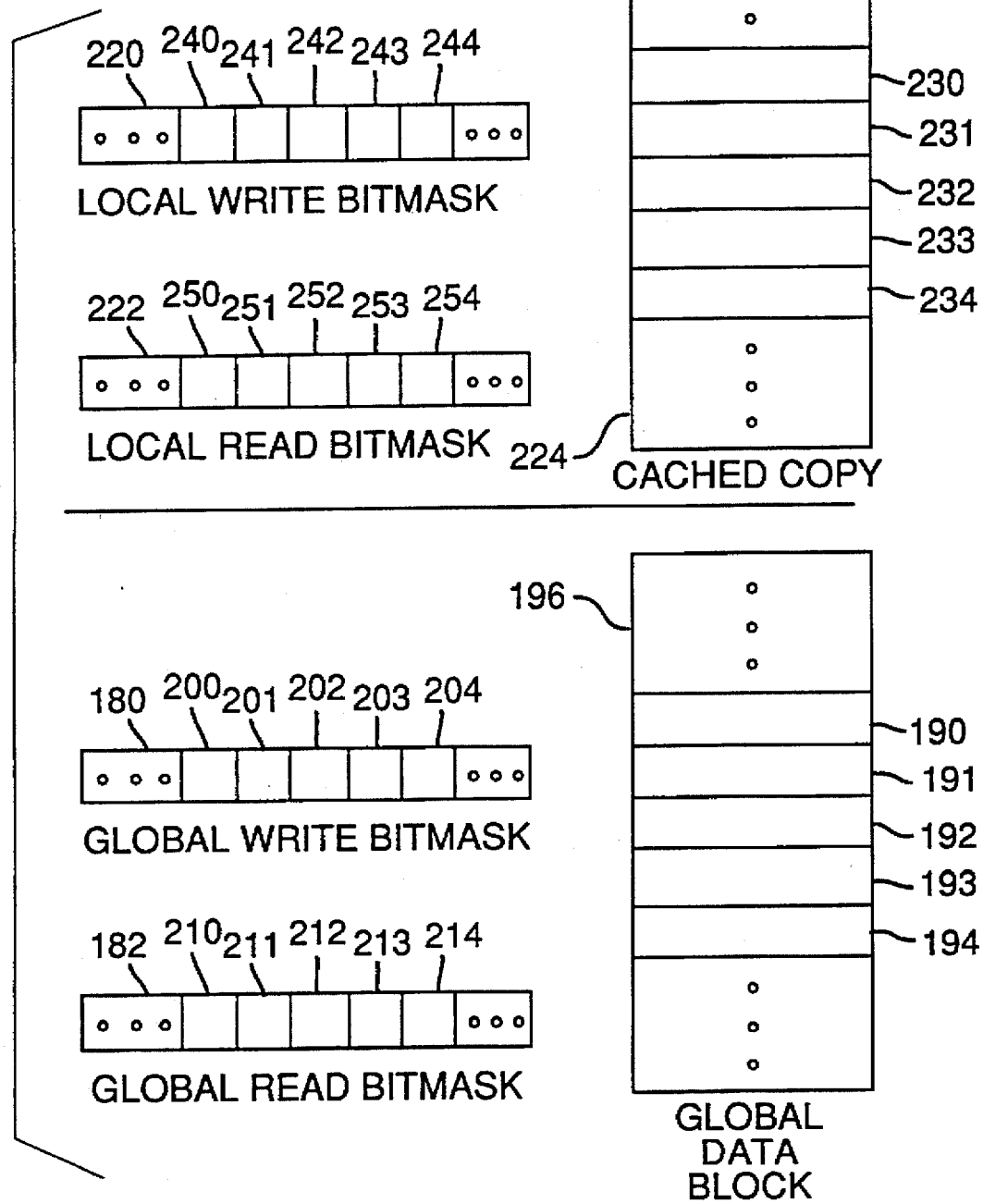
FIG. 5 is a diagram showing local and global, write and read bitmasks stored in the local memory and global memory of the computer system of FIG. 1 for identification of data errors according to a fifth embodiment of the invention.

Referring now to FIGS. 1 and 5, in a fifth embodiment of the invention, a global write bitmask 180 and a global read bitmask 182 for each data block 184 are stored in the global memory 32 (FIG. 1) with the data block for identification of data race conditions. (For purposes of illustration only, the copy 224 is described herein as being cached by the processor 22 and the block 196 as being stored by the global memory unit 26. It should be understood that other processors 23–24 and global memory units 27 of the computer system 20 preferably operate in a like manner.) The global write bitmask 180 is used for tracking which elements 190–194 of the block 184 are modified during merging, and consists of a plurality of flags 200–204 associated in a one-to-one relationship with the elements. The global read bitmask 182 is used for tracking which of the elements 190–194 are read, and likewise consists of a plurality of flags 210–214 associated in a one-to-one relationship with the elements. The flags 200–204, 210–214 are initially set to not written and not read values, respectively, and are reset to these values when merging is complete. Preferably, each flag is a single bit, with zero being the not written and not read values.

Also in the fifth embodiment of the invention, a local write bitmask 220 and a local read bitmask 222 are stored in the processor's local memory 44 along with a copy 224 of the data block 184 when the copy is cached by the processor 22. The local memory controller 40 tracks which data elements 230–234 of the copy 224 are modified, while the copy 224 is cached in the local memory 44, with the local write bitmask 220. The local write bitmask 220 consists of flags 240–244, one for each element 230–234 of the copy 224. The local memory controller 40 initially sets the flags 240–244 to a not written value, indicating the elements 230–234 have not yet been modified. The local read bitmask 222 also has flags 250–254, initially set to a not read value, one for each of the elements 230–234. Preferably, each flag is a single bit, with zero being the not written and not read values.

When the central processing unit 36 writes to elements 230–234 of the cached copy 224, the local memory controller 40 sets the local write bitmask flags 240–244 associated with the written elements to a written value. Again, the written value is preferably one for a single bit flag, and the not written value is zero. Likewise, when elements 230–234 of the cached copy 224 are read by the central processing unit, the local memory controller 40 sets the local read bitmask flags 250–254 associated with those elements read to a read value (also preferably one for a single bit flag). Thus, the local write and read bitmasks 220, 222 indicate which elements of the cached copy 224 have been written and read, respectively.

After the cached copy 224 is flushed from the local memory 44, the local memory controller 40 transmits the local bitmasks 220, 222, and the cached copy 224 to the global memory unit 26 for merging with the data block 196. The global memory controller 30 merges the cached copy 224 and the data block 196 as described above in connection with FIG. 2 using the local write bitmask 220.

The local write and read bitmasks 220, 222 also are used in the global memory unit 26 to determine if a data race has been created. As described above, a write/write data race results when more than one processor writes a same data element of a data block between synchronizations. To determine if a write/write data race has been created, the local write bitmask 220 and global write bitmask 180 are compared to determine if flags in corresponding positions of the bitmask are both set to the written value. The global write bitmask flags 200–204 indicate which elements 190–194 of the block 196 have already been modified from merging other cached copies with the block. The local write bitmask flags 240–244 indicate which elements 230–234 of the copy 224 have been modified. Thus, if flags in corresponding positions of the write bitmasks 180, 220 are both set to the written value, a same data element has been modified in the cached copy currently being merged and in the data block from a previously merged copy.

The determination that flags in corresponding positions of the write bitmasks 180, 220 are both set to the written value can be done quickly where the flags are single bits, the written value is one, and the not written value is zero. This is done by performing a bit-wise logical AND of the bitmasks 180, 220. If any of the bits in the result of the AND operation are non-zero, then a same data element has been modified in both the cached copy and data block. Further, the position of such non-zero bits in the AND operation result is indicative of which data element or elements have been modified in both the cached copy and data block. This information can be quite useful in locating bugs in the process running on the processor 22 which result in write/write data races.

Further, as described above, read/write data races result from one processor reading a data element modified by another processor between synchronizations. To determine whether a read/write data race has been created, the local read bitmask 222 and global write bitmask 180 are compared. The local write bitmask 220 and global read bitmask 182 also are compared. If flags in corresponding positions of the local read and global write bitmasks 222, 180 are set to the read and written values, respectively, then a same data element has been read in the cached copy 224 currently being merged and modified in the data block 196 from a previously merged copy. Also, if flags in corresponding positions of the local write and global read bitmasks 220, 182 are set to the written and read values, respectively, then a same data element has been modified in the cached copy 224 currently being merged and read in a previously merged copy of the data block 196. As in the comparison of the local and global write bitmasks 220, 180, these determinations preferably are made using a bit-wise logical AND operation on the bitmasks.

After the cached copy 224 is merged with the data block 196, the write bitmask 220 is merged with the global write bitmask 180. For each of the flags 240–244 in the cached copy write bitmask 220 set to the written value, the global memory controller 30 sets the global write bitmask flag 200–204 in a corresponding position to the written value. Also, global write bitmask flags 200–204 already set to the written value remain set to the written value. The merging of the write bitmasks can be performed quickly with a bit-wise logical OR operation where the write bitmask flags 200–204, 240–244 are single bit values, the written value is one, and the not written value is zero. The global memory controller performs a bit-wise logical OR operation on the write bitmasks 180, 220 and stores the results into the global write bitmask 180.

The read bitmask 222 also is merged with the global read bitmask 182 in a like manner. For each of the flags 250–254 in the cached copy read bitmask 222, the global memory controller 30 sets the global read bitmask flag 210–214 in a corresponding position to the read value. Global read bitmask flags 210–214 already set to the read value remain set to the read value. Preferably, each bitmask has single bit flags, the read value is one, and the not read value is zero, permitting merger of the bitmasks 182, 222 with the bit-wise logical OR operation.

When the cached copy 229 and data block 196 are merged as described above in connection with FIG. 2, flags in corresponding positions of local and global bitmasks 220, 222, 180, 182 may both be set to the read or written values as a result of a single processor's reading or modifying the associated data element in cached copies of the block 196 that have been (re-)cached multiple times. Accordingly, the bitmasks identify both reading/modifying of the data elements 190–194 by multiple processors which creates a data race and by a single processor in re-cached copies which does not create a data race. Alternatively, so that the bitmasks identify only actual data races, the processors 22–24 can be prevented from caching further copies of the data block 196 after merging begins using the suspend flag 160 (FIG. 4) and suspend queue 162 described above. This alternative prevents modifying or reading and modifying of a data element by a single processor in multiple, re-cached copies of the data block 196 by suspending further requests for the data block after merging begins. However, suspending the requests imposes an arbitrary delay on these processors until all outstanding copies of the block are merged.

Referring again to FIG. 1, in a sixth embodiment of the invention, communications traffic between the processors 22–24 and global memory units 26, 27 is lessened by performing certain "data reduction" operations in the global memory units (such operations are herein termed global reduction operations). Global reduction operations can take several forms, and can be performed on both data values and lock values. In many processes executed on the multiprocessing computer system 20, it is desirable to perform a first form of global reduction operation on a set of data that results in a single value which is then stored at a particular location in a data block. For example, a process may need to store the maximum or minimum value from an array of values in an element of a data block. Other common global reduction operations of this type include storing the sum or product of a set of data elements, or storing the result of an AND or OR operation performed on all elements in a set at a particular location of a data block.

According to the sixth embodiment of the invention, certain data reduction operations are performed by the global memory controllers 30, 31 in response to data reduction requests by the processors 22–24. For example, to perform a data reduction operation which stores the maximum value of a set of data elements in the global memory 32 at a particular location, the processor 22 transmits a request to the global memory controller 30 specifying the "reduce to maximum" operation, the subject set of data elements, and the location where the result is to be stored. (The specified set of data elements may be stored anywhere in the global memory 32.) In response, the controller 30 performs the requested operation. The controller 30 locates the maximum value in the specified set and stores that value in the specified location.

In a second form of global reduction operation, a processor (the processor 22, for example) requesting the global reduction operation provides an operand, and specifies a global memory location of a second operand. The requesting processor 22 also specifies the operation to be performed on these operands. Again, the operation itself is performed by the global memory controller 30 for the specified memory location. The global memory controller 30 performs the operation on the operands, and stores the result in the global memory 32, either in place of the second operand or in another location specified by the processor 22.

Performing data reduction operations in the global memory units 26, 27 lessens communications traffic between the processors 22–24 and global memory units. When data reduction operations are performed by the processors 22–24 themselves considerable data must be exchanged. The processor performing the data reduction operation must transmit data requests to the global memory unit for the subject set of data elements. In response, the global memory unit transmits copies of the data block or blocks which contain the subject set to the requesting processor for caching. The processor performs the data reduction operation on the cached copies, and writes the result to the target location (which may be in yet another data block and require caching of such other block). The processor then transmits the now modified copy containing the target location and associated write bitmask back to the global memory unit for merging with the data block. Further, each of these various data block accesses generally requires accessing a lock associated with that data block (which may necessitate waiting for a merging process to complete), and afterwards releasing the lock.

By contrast, when data reduction operations are performed in the global memory units 26, 27, only a data reduction and data value for use in data reduction request (and, in some cases an operand data value) is transmitted from a requesting processor to a global memory unit performing the operation. Also, the overhead associated with the processor accessing locks for the various data blocks is avoided.

Referring again to FIG. 1, a large number of the processors 22–24 in the computer system 20 may, at times, require access to a single data block stored in one of the global memory units 26, 27. (It will be recognized that the three processors 22–24 and two global memory units 26–27 shown in FIG. 1 are illustrative of the large number of processors and global memory units which can be included in the computer system 20.) In such situations, the global memory unit storing the data block must service a large number of data requests, and later merge cached copies of the block. Accordingly, the rate at which the global memory unit can perform these servicing and merging operations may be exceeded. As a result, some of the servicing and merging operations are delayed, creating what is called a "bottleneck." At the same time, other global memory units may be idle.

In the seventh embodiment of the invention, those possible bottlenecks resulting from a large number of processors accessing a single data block stored in one processor is avoided by sharing and merging hierarchically such data blocks among several global memory units. For example, when the global memory unit 26 begins to receive a large number of data block requests for a same data block (e.g. when the number of data block requests exceeds some predetermined limit), the global memory unit 26 transmits a copy of the data block (hereafter "originating data block") to another global memory unit 27. On receiving the copy in the global memory unit 27, the global memory controller 31 stores the copy (hereafter "global copy") in the global memory 33.

Figure 6:
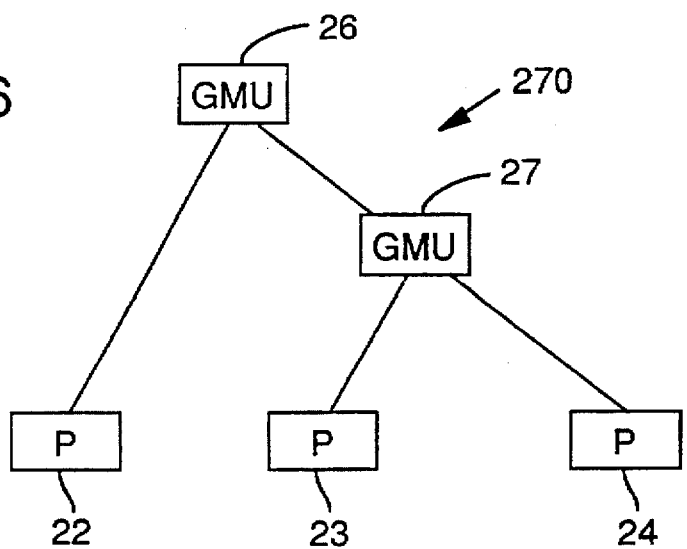
FIG. 6 is a diagram showing a hierarchical ordering of processors and global memory units in the computer system of FIG. 1 according to a seventh embodiment of the invention.

Referring to FIGS. 1 and 6, the servicing of further data block requests for the block and merging of cached copies of the block is then divided between the global memory units 26, 27. Preferably, the dividing is done according to a predetermined hierarchical ordering of the processors and global memory units. One such hierarchical ordering 270 of the processors 22–24 and global memory units 26–27 is shown in FIG. 6. It will be recognized that the hierarchical ordering is a logical ordering or assignment of the processors to the global memory units, and does not reflect any change to the structure of the computer system illustrated in FIG. 1. Also, it is to be understood that hierarchical orderings, in accordance with this embodiment of the invention, can include many more processors, global memory units, and hierarchical levels than that illustrated in FIG. 6. More specifically, the computer system 20 can include additional global memory units, and global copies of the originating data block can be stored in more than one of these global memory units. Also, many processors will typically be assigned to each of the global memory units storing a global copy of the originating data block.

In the predetermined hierarchical order 270, some of the processors are assigned to the global memory unit 26 and others to the global memory unit 27. Those data block requests transmitted by processors 22 assigned to the global memory unit 26 are serviced by that unit. Also, merging of copies of the block cached by processors 22 assigned to the unit 26 are merged with the originating data block as described above in connection with FIG. 2. However, servicing of data block requests and merging of cached copies for those processors 23, 24 assigned to the unit 27 is performed by the unit 27.

In the global memory unit 27, copies cached in the processors 23, 24 are merged with the global copy stored in the global memory 33. Similar to the merging described above in connection with FIG. 2, each cached copy is merged with the global copy by storing those elements of the cached copy, whose associated flags in a local write bitmask are set to the written value, into the global copy. Also, so that the global copy can later be merged with the originating data block stored in the unit 26, a global write bitmask is stored in the unit 27. This global write bitmask has flags associated in a one-to-one relationship to elements of the global copy. These flags are initially set to the not written value. Then, when elements of the global copy are modified while merging a cached copy, the global write bitmask flags associated with such elements a flag are set to the written value.

Once all cached copies from processors assigned to the unit 27 are merged with the global copy, the global copy is merged with the originating data block. To merge the global copy and originating data block, those elements of the global copy, whose associated global write bitmask flags are set to the written value, are stored in corresponding positions of the originating data block.

Figure 7:
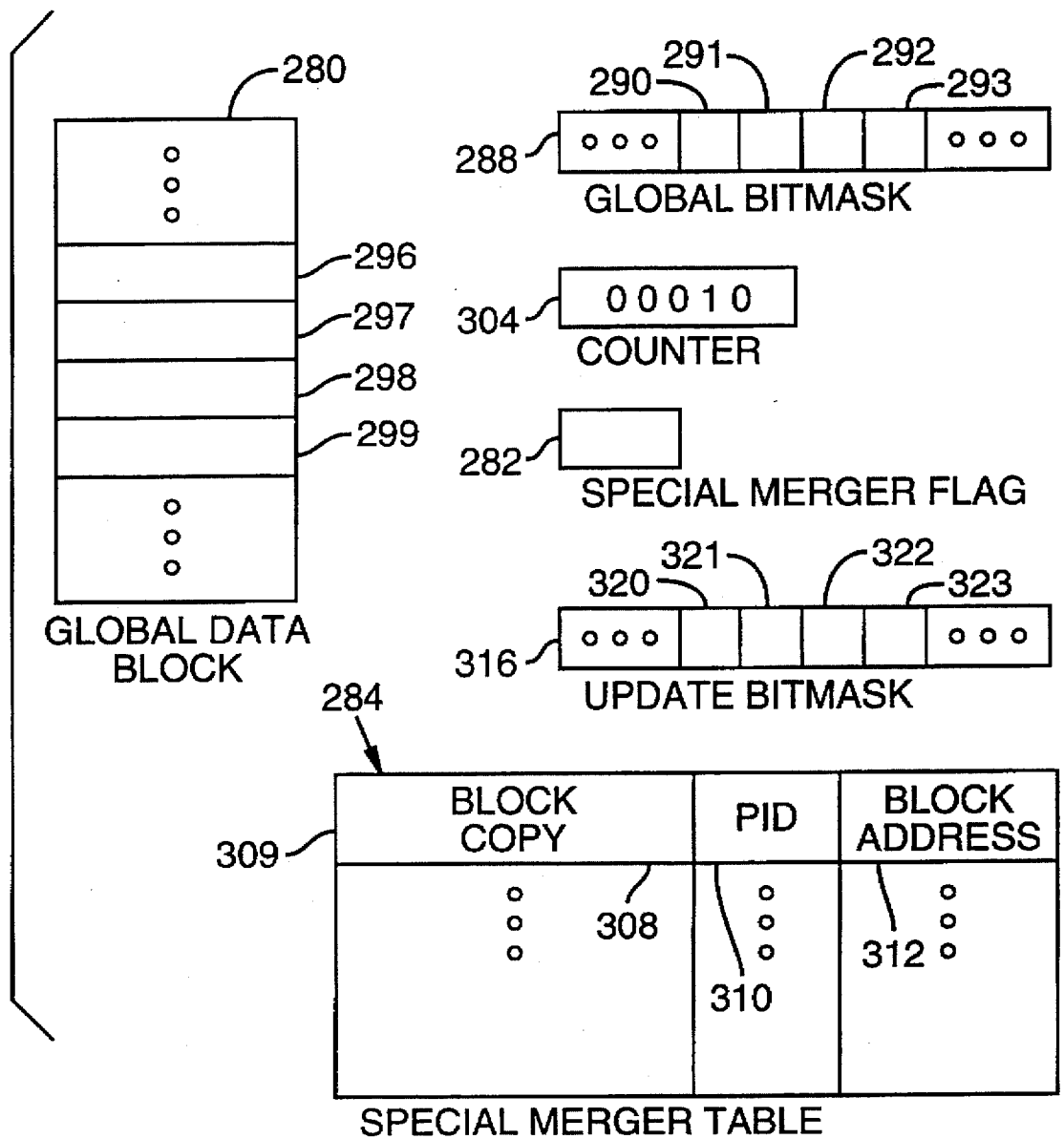
FIG. 7 is a diagram showing a global write bitmask, special merger flag and table associated with a data block and stored in a global memory of the computer system of FIG. 1 according to an eighth embodiment of the invention.

Referring to FIG. 7, in an eighth embodiment of the invention, the need to suspend requests by the processors 22–24 (FIG. 1) for a data block 280 stored in the global memory 32 (FIG. 1) once merger begins is avoided with an alternative merger scheme utilizing a special merger flag 282 and a special merger table 284 associated with the data block 280. By contrast, in the first embodiment of the invention described above, the need to suspend requests for partially merged data blocks is avoided with a merger scheme utilizing local write bitmasks 56 (FIG. 2) associated with cached copies of the block.

The merger scheme of the eighth embodiment has two merger modes, a "normal" mode and a "special" mode, controlled by the state of the special merger flag 282. The special merger flag 282 has two states, a first state indicative of the normal merger mode and a second state indicative of the special merger mode. Initially, the special merger flag 282 is set to the first state, and the normal merger mode used. After merger begins and a request is made to cache a copy of the now partially merged data block 280, the special merger mode is used, and the special merger flag 282 is set to the second state.

In the initial, normal merger mode, copies of the data block 280 can be requested by the processors 22–24 and stored or cached in their local memories 44–46 (FIG. 1). When flushed from the local memories 44–46, the cached copies are merged with the data block 280 in the global memory unit 26 (FIG. 1) with the aid of a global write bitmask 288 associated with the data block. The global write bitmask 288 contains bitmask flags 290–293 to indicate which data elements 296–299 of the data block 280 have not been modified since the last complete merger. Initially, the bitmask flags 290–293 are all set to a not modified value. Each cached copy is merged by storing those data elements of the cached copy which differ from correspondingly positioned, unmodified data elements 296–299 of the data block. The bitmask flags 290–293 for the data block elements 296–299 so modified are set to a modified value.

A counter 304 tracks the number of cached copies of the data block 280 still outstanding. The counter 304 is incremented for each copy of the data block 280 cached by the processors 22–24, and decremented for each cached copy of the data block 280 flushed from the local memories 44–46. Merger is complete when the counter 304 returns to zero. Whereupon, all global write bitmask flags 290–293 are reset to the not modified value.

After merger in the normal merger mode begins (i.e. at least one cached copy has been merged with the data block 280 modifying at least one of the data elements 296–299), any subsequent request for a copy of the data block 280 by the processors 22–24 causes entry into the special merger mode. (In the prior Karp-Sarkar merger scheme, such subsequent requests would be suspended.) To determine whether merger has begun, the global write bitmask 288 can be tested. If any of the bitmask flags 290–293 are set to the modified value, merging has begun. Accordingly, when the global memory controller 30 (FIG. 1) receives a request for a copy of the data block 280 and the global write bitmask is non-zero (where the modified value of the bitmask flags is a one bit), the controller 30 sets the special merger flag to the second state to enter the special merger mode.

When in the special merger mode, the global memory controller 30 responds to a request for a copy of the data block 280 (including the request that caused entry into the special merger mode) from one of the processors 22–24 by transmitting the copy to the requesting processor. (Such copies obtained while in the special merger mode are "partially merged" copies since they are obtained after merger of the data block 280 begins.) The global memory controller 30 also tracks these partially merged copies using the special merger table 284. The global memory controller stores a duplicate of the partially merged copy 308 (identical to that sent to the requesting processor) in an unoccupied slot 309 of the special merger table 284, along with a processor identifier 310 (to identify the requesting processor) and a block address 312 (to identify the data block 280 from which the duplicate copy originated). The duplicate copy 308, processor identifier 310, and block address 312 constitute an "entry" in the special merger table. The block address 312 permits the special merger table 284 to be used for more than one global memory data block. Alternatively, special merger tables, one for each data block, can be allocated as needed out of an unused portion of the global memory 32 (FIG. 1). With such alternative special merger tables, the block address 312 need not be stored.

On merging a cached copy with the data block 280 while in the special merger mode, the global memory controller searches the special merger table 284 for an entry containing the processor identifier 310 of the processor that cached the copy, and the block address 312 for the data block 280 (from which the cached copy originated) to determine whether the cached copy is a partially merged copy. If the table contains no such entry (indicating the cached copy is not a partially merged copy), the cached copy and data block 280 are merged as in the normal merger mode using the global bitmask 288. If, however, such a matching entry (e.g. entry 309) exists (indicating the cached copy is a partially merged copy), the cached copy is merged using an update bitmask 316.

When merging a partially merged copy, the global memory controller 30 generates the update bitmask 316 which contains bitmask flags 320–323 associated with data elements of the partially merged copy (not shown). The controller 30 sets those bitmask flags 320–323 to the modified value that are associated with data elements of the partially merged copy which differ from correspondingly positioned data elements of the duplicate copy 308 in the matching entry 309. This update bitmask 316 controls the merge. The controller 30 stores those partially merged copy data elements whose associated bitmask flags 320–323 are set to the modified value into the global data block 280. The matching queue entry 309 is then cleared.

After merging the partially merged copy into the global data block 380, the global memory controller 30 also merges the update bitmask 316 into the global bitmask 288. For each of the bitmask flags 320–323 of the update bitmask 316 set to the modified value, the controller 30 sets the correspondingly positioned bitmask flags 290–293 of the global bitmask 288 to the modified value. Where the modified value is a single one bit and the not modified value is a single zero bit, the merge can be effected by storing the result of a bit-wise logical OR of the global and update bitmasks 288, 316 into the global bitmask 288.

The just described, alternative merger scheme of the eighth embodiment of the invention also can be applied to the subword merging scheme of the third embodiment described above to eliminate the need for suspending processor requests occurring after subword merging begins. In such an embodiment of the invention in which the subword store merger scheme is supplemented with the alternative merger scheme, any requests occurring after merging a cached copy modified by a subword store operation with a global memory data block are not suspended. Instead, the global memory controller 30 (FIG. 1) sends the requested copy of the partially merged data block to the requesting processor, makes a corresponding entry in a special merger table, and sets a special merger flag. Thereafter, cached copies having matching table entries are merged with an update bitmask, and cached copies without matching entries are merged with a global bitmask as in the eighth embodiment. Prior to the special merger flag being set, cached copies are merged as in the third embodiment.

Referring to FIGS. 1 and 3, a ninth embodiment of the invention provides for data merging in the global memory units 26, 27 (FIG. 1) at the bit level. With this capability, more than one of the processors 22–24 (FIG. 1) can modify bits in the same byte of a shared data block, as long as no two processors modify a same bit between synchronizations. The separate modified bits in each processor's cached copy are later merged at the bit level into the originating global memory data block. Any data races produced by sharing data between multiple processors also can be detected at the bit level.

With reference to FIG. 3, in the ninth embodiment of the invention (as in the third embodiment), a subword store flag 110 and cached copy write bitmask 88 is associated with each cached copy 86 stored in the processor's local memories 44–46. The subword store flag 110, in the ninth embodiment, preferably comprises a 2-bit value for indicating the minimum size data element that has been modified in the cached copy 86. With a 2-bit value, four minimum sizes can be indicated. For example, a value of "11" can be used to indicate individual bits of the cached copy were modified. Values of "10," "01," and "00" can be used for indicating that bytes, half-words (generally 16-bit data elements), or words, respectively, were the minimum sized data elements modified.

When, in the ninth embodiment, a word, half-word, or byte is the minimum sized data element modified, the cached copy 86 is merged with its originating data block in the same manner as in the third embodiment. More specifically, when a word is the smallest sized data element modified, the cached copy is merged using the cached copy write bitmask 88. When the minimum size data element modified is a half-word or byte, the cached copy is merged using a subword write bitmask 124 (FIG. 4) having a bitmask flag for each half-word or byte, respectively, of the originating data block 118 (FIG. 4). Cached copies modified at the bit level are merged as described below. Once the originating data block 118 is merged at the half-word, byte, or bit level, any remaining cached copies of the data block also are merged at that same level until a lower level merge is necessary or merger is complete.

Generally, for most cached copies, the minimum size modified element is the word. The merging process for such cached copies is fastest, requiring less processing effort and a smaller bitmask. Cached copies having minimum size modified elements of bytes or half-words occur less frequently. Merging them takes more processing effort and time. Merger of cached copies modified at the bit level is even less frequent, and more processing time and effort consuming. Thus, the advantage of merging at the level of the minimum size modified data element is that processing time and effort are minimized for a given cached copy, while permitting data sharing between processors down to the bit level when necessary.

Figure 8:
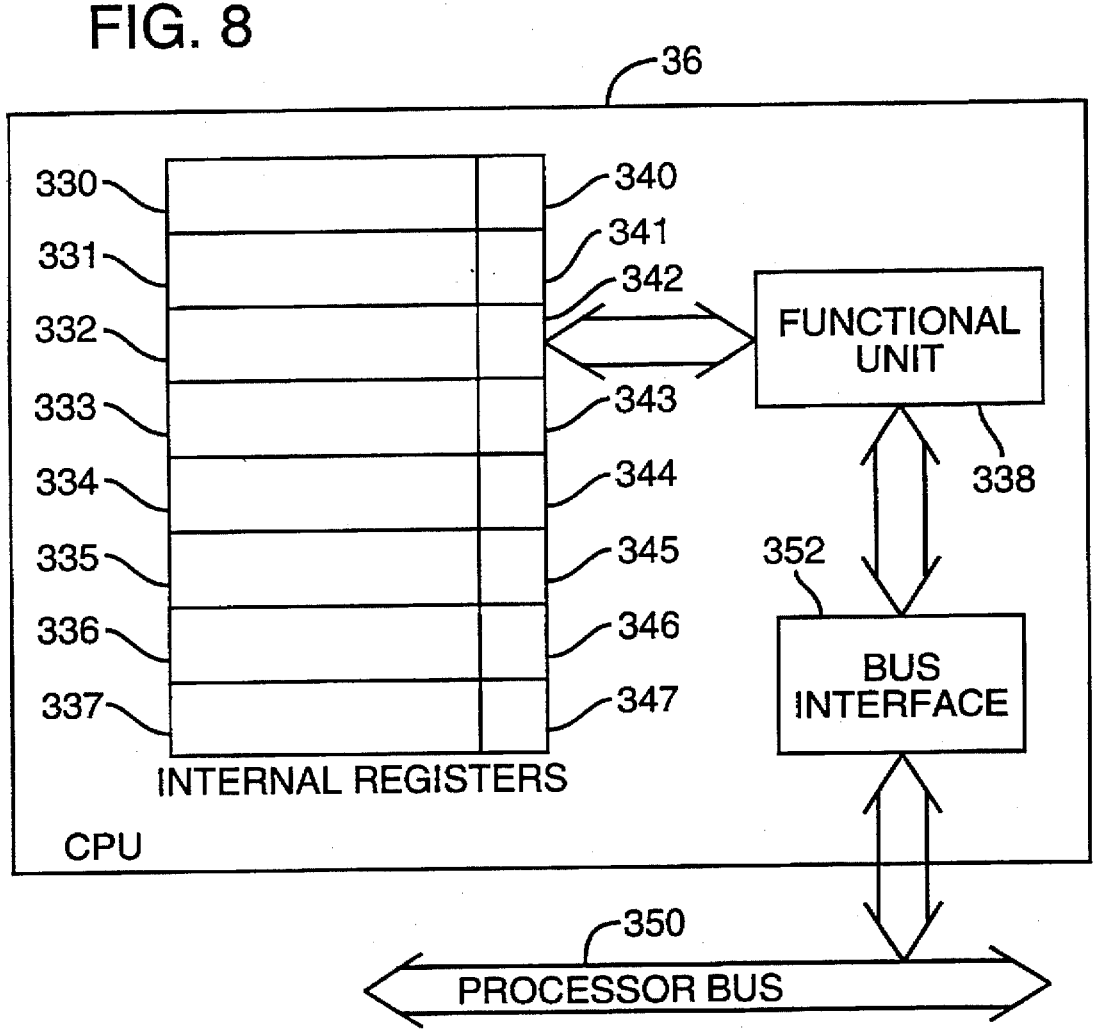
FIG. 8 is a generalized block diagram showing internal registers and bit-modify flags of a CPU in the computer system of FIG. 1 according to a ninth embodiment of the invention.

Referring now to FIGS. 1, 3, and 8, for merging at the bit level, it is necessary to detect when bit level modifications of the cached copy 86 are made. With conventional CPUs 36–38, generally only store operations (in word or byte sized increments) executed by the CPUs directly modify data in cached copies stored in the local memories 44–46. Modification of a word or byte in such cached copies can therefore be detected from when a CPU 36–38 performs a store operation to move the word, half-word, or byte from its internal registers to the local memories 44–46. Since only load and store operations move data between the CPUs 36–38 and local memories 44–46, individual bits of a cached copy are modified indirectly. To modify individual bits, the CPUs 36–38 load an internal register with a byte or word of data, perform one or more bit level operations on the data, then store the word or byte to the cached copy in the local memories 44–46.

To detect bit level modifications, the CPUs 36–38 in the ninth embodiment maintain a bit-modify flag for each of its internal registers. For example, as illustrated in FIG. 8, the CPU 36 may have eight internal registers 330–337 for temporary storage of data being processed by the CPU's functional unit 338. In general, the functional unit 338 contains integer and floating point processing circuitry, and instruction decoding circuitry. The CPU 36 also has one bit, bit-modify flags 340–347, one for each of the internal registers 330–337. The CPU 36 transfers data between the internal registers 330–337 and local memory 44 (FIG. 1) over a processor bus 350 and bus interface 352.

The bit-modify flags 340–347 indicate whether data in their associated registers 330–337 have been modified at the bit level. Initially, when the CPU loads data into any one of the internal registers 330–337, the bit-modify flag 340–347 for the register is set to an unmodified value (e.g. a zero bit). When the CPU 36 executes with its functional unit 338 an instruction that modifies one or more bits of data in a register, but not an entire byte or word, the functional unit 338 sets the bit-modify flag to a modified value (e.g. a one bit). Then, when the CPU 36 stores data from one of the internal registers 330–337 into the cached copy 86 in the local memory 44, the local memory controller 40 checks the bit-modify flag associated with that register to determine whether the cached copy should be merged at the bit level, and sets the sub-word modify flag 110 for the cached copy accordingly.

Referring now to FIG. 4, in the ninth embodiment, when the subword store flag 110 is set to "11" indicating the minimum size modified element is the bit, the cached copy 86 is merged with its originating data block 118 at the bit level. For a bit level merge, bitmask flags 126–137 of the subword store bitmask 124 are associated in a one-to-one relationship with bits of the data block 118. (FIG. 4 illustrates the case where the bitmask flags 126–137 are associated in a one-to-one relationship with bytes 146–157 of the data block for a byte level merge.) Preferably, each of the bitmask flags 126–137 is a single bit value, with a one bit indicating the associated bit of the data block 118 has been modified (such as in a previous merge) and a zero bit indicating no modification. Using this subword store bitmask 124, the modified bits of the cached copy 86 in positions corresponding to unmodified bits of the data block 118 are stored in the data block to effect the bit level merge.

In the preferred bit level merge, the global memory controller 30 (FIG. 1) for the originating data block 118 (assuming the data block 118 is stored in the global memory 32), creates a temporary bitmask (not shown) with a single-bit flag for each bit of the data block 118 from a bit-wise exclusive OR of the cached copy 86 and block 118. This sets each temporary bitmask flag associated with a bit of the data block 118 that differs from the correspondingly positioned bit in the cached copy 86 to a one value. Next for each bit of the data block 118 that has not previously been modified, the global memory controller 30 stores the correspondingly positioned bit of the cached copy 86 in place of that bit. This can be done with bit-wise logical AND and OR operations as shown by the following equation:

$$B = (B \text{ AND NOT } M) \text{ OR } (C \text{ AND } M) \tag{1}$$

where B represents the data block 118, M represents the subword store bitmask 124, C represents the cached copy 86, AND is the bit-wise logical AND operation, OR is the bit-wise logical OR operation, and NOT is the logical complement operation. Then, the global memory controller 30 performs the bit-wise logical OR operation of the subword store bitmask 124 with the temporary bitmask to update the subword store bitmask.

Since the half-word, byte, and bit level merges are controlled according to which data elements of the data block remain unmodified, it is necessary to account for the possibility of a single processor caching and modifying a data block more than once between synchronizations. Either the suspend scheme of the third embodiment or the alternative merger scheme of the eighth embodiment can be used for this purpose.

Having described and illustrated the principles of our invention with reference to a preferred embodiment, it will be recognized that the invention can be modified in arrangement and detail without departing from such principles. In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for sharing memory in a multiprocessor computer system, the method comprising:

storing a plurality of data blocks in a global memory;

for each processor so requesting, storing a copy of an originating one of the data blocks in a cache memory local to the requesting processor for access by the requesting processor;

storing in the cache memory a bitmask comprising a flag associated with each data element in the copy, each flag initially set to a first value;

setting the flag in the bitmask associated with each of the data elements written by the requesting processor to a second value;

merging the copies by storing into said global memory those elements of the copies that said flags in said bitmask indicate were modified into the data block; and for each processor accessing data in one of the data blocks associating in the local memory of the processor a subword store flag with the local copy, the subword store flag being indicative of the minimum size data element modified and initially set to indicate a first size, the first size being that of the first sized data elements, setting the subword store flag to indicate a second size when the processor performs a subword store operation on the local copy, and sending the subword store flag along with the local copy and the local copy write bits to the global memory when the local copy is flushed from the local memory.

2. The method of claim 1, wherein merging includes storing each data element of the copy, whose associated flag is set to the second value, into the originating data block.

3. A method for sharing a memory among multiple processors, comprising:

storing shared data in a global memory, the shared data including a plurality of data blocks and a global write bitmask having one bit for each data element of said data blocks;

for each processor accessing data in one of the data blocks storing a local copy of said data block in the local memory of the processor, transmitting the local copy to the global memory when the local copy is flushed from the local memory and merging the local copy and the data block in the global memory by associating a plurality of local copy write flags in the local memory in a one-to-one relationship with a plurality of first sized data elements in the local copy, each of the local copy write flags initially set to a not written value, for each of the first sized data elements of the local copy which is modified by the processor, setting its associated local copy write flag to a written value, transmitting the local copy write flags to the global memory when the local copy is flushed from the local memory, and for each of the local copy write flags set to a written value, storing the first sized data element associated with such local copy write flag in the data block; and when multiple processors access the data block concurrently comparing said local copy write flags to said global write bitmask, and identifying the occurrence of a write/write data race condition when said comparison indicates that at least two processors have sent local copy write flags both set to the written value and associated with first sized data elements in corresponding positions of their respective local copies.

4. The method of claim 3, further comprising, for each processor accessing data in one of the data blocks:

associating in the local memory of the processor a subword store flag with the local copy, the subword store flag being indicative of the minimum size data element modified and initially set to indicate a first size, the first size being that of the first sized data elements;

setting the subword store flag to indicate a second size when the processor performs a subword store operation on the local copy; and sending the subword store flag along with the local copy and the local copy write bits to the global memory when the local copy is flushed from the local memory.

5. The method of claim 4, wherein merging the local copy and the data block in the global memory includes:

when the subword store flag is set to indicate the second size associating a plurality of data block write flags in the global memory one-to-one with a plurality of second sized data elements in the data block, the second data elements being of the second size, the data block write flags initially being set to the not written value, and for each second sized data element of the data block whose associated flag is set to the not written value, if a data element in a corresponding position of the local copy and such second sized data element differ, storing the local copy data element in place of such second sized data element and setting the data block write flag associated with such second sized data element to the written value; and when the subword store flag is set to indicate the first size for each of the local copy write flags set to the written value, storing the first sized data element associated with such local copy write flag into the data block.

6. The method of claim 3 further comprising:

associating a plurality of data block write flags in the global memory with a plurality of first sized data elements in the data block, each of the data block write flags initially set to a not written value;

for each processor accessing data in one of the data blocks associating a plurality of read flags in the local memory in a one-to-one relationship with the first sized data elements of the local copy, the read flags initially being set to a not read value, when a first sized data element is read by the processor, setting its associated read flag to a read value, and transmitting the read flags along with the local copy and the local copy write flags to the global memory when the local copy is flushed from the local memory; and when multiple processors access a same data block concurrently comparing said read flags transmitted from said local memory with said write flags in global memory, and identifying the occurrence of a read/write data race when said comparison indicates that one processor has sent a local copy write flag set to the written value and another processor sends a read flag set to the read value, and said write and read flags are associated with first sized data elements in corresponding positions of their respective local copies.

7. The method of claim 3, further comprising:

associating a lock flag with each data block in the global memory, the lock flag being initially set to an unlocked value;

setting the lock flag to a locked value when requested by a first of the processors;

associating a count storage with each data block, said count storage containing a count of processors with unmerged cached copies of said data block;

while the lock flag is set to the locked value, prohibiting access to the data block by any of the processors and placing a request for access to the data block or lock by such processor in a suspended access request queue;

resetting the lock flag to the unlocked value when requested by the first processor; and when the lock flag is reset to the unlocked values processing the requests in the suspended access request queue.

8. The method of claim 3, further comprising, when requested by a processor, performing a global reduction operation on data in the global memory, and storing a result of the global reduction operation in a specified location of the global memory.

9. The method of claim 3, further comprising:

storing a plurality of global copies of a data block, one in each of a plurality of global memories;

associating a plurality of processors with each of the plurality of global memories;

when a processor requests access to the data block, accessing by such processor the global copy of the data block in a global memory associated with such processor;

accessing the global copy by storing a local copy of the global copy in a local memory of the accessing processor, and when the local copy is flushed from the local memory, merging the local copy with the global copy in the global memory associated with the accessing processor; and after all local copies of one of the global copies are merged with such global copy, merging such global copy with another of the global copies.

10. A method for sharing a memory among multiple processors, comprising:

storing shared data in a global memory, the shared data comprising a plurality of data blocks;

for each processor accessing data in one of the data blocks storing a local copy of said data block in the local memory of the processor, transmitting the local copy to the global memory when the local copy is flushed from the local memory, and merging the local copy and the data block in the global memory by associating a plurality of data block write flags in the global memory with a plurality of first sized data elements in the data block, each of the data block write flags initially set to a not written value, associating a special merger flag with the data block in the global memory, the special merger flag initially set to a first value, for each local copy stored while the data block is partially merged storing in said global memory a duplicate copy of the partially merged data block in a table entry for the local copy, and setting the special merger flag to a second value, and when storing data from the local copy into a corresponding data block in said global memory if the special merger flag is set to the first value, storing those data elements of the local copy that differ from correspondingly positioned, first sized data elements of the data block whose associated data block write flag is set to the not written value into the data block, if the special merger flag is set to the second value and the local copy was stored while the data block was not partially merged, storing those data elements of the local copy that differ from correspondingly positioned first sized data elements of the data block whose associated data block write flag is set to the not written value into the data block, and if the special merger flag is set to the second value and the local copy was stored while the data block was partially merged, storing those data elements of the local copy which differ from correspondingly positioned elements of the duplicate copy in the table entry for the local copy into the data block; and when multiple processors access the data block concurrently comparing said local copy write flags to said global write bitmask, and identifying the occurrence of a write/write data race condition when said comparison indicates that at least two processors send local copy write flags both set to the written value and associated with first sized data elements in corresponding positions of their respective local copies.

11. A shared memory multiprocessing computer system comprising:

one or more global memory units, each global memory unit comprising a global memory for storing a plurality of data blocks of shared data, each data block comprising a plurality of multi-bit data elements;

a plurality of processing units interconnected with the one or more global memory units, each of the processing units comprising a processor and a local memory for storing a write bitmask and a local copy of one of the data blocks when access to data in the data block is requested by the processor, the write bitmask comprising a plurality of flags associated in a one-to-one relationship with data elements of the local copy, the flags being initially set to a not written value when the local copy is stored in the local memory;

each of the processing units further comprising a local memory controller, each local memory controller being operative to set those write bitmask flags which are associated with data elements written by the processor to a written value, and, when the local copy is replaced with other data in the local memory, to send the write bitmask and written data elements to the global memory unit if any of the data elements have been written by the processor;

a global memory controller in the global memory unit being operative to merge a local copy received from one of the processing units by storing in the data block each of the data elements whose associated write bitmask flag is set to the written value.

12. The computer system of claim 11, wherein each data element comprises an integer number of multi-bit subelements, the system further comprising:

means for storing in the local memory a subword store flag associated with the local copy, the subword store flag indicative of the minimum sized data element of the local copy yet modified, and initially set to indicate an element size;

the processor being operative to store a subelement of a data element of the local copy;

means for setting the subword store flag to indicate a subelement size when the processor modifies one or more, but not all subelements of a data element in the local copy;

the local memory controller being operative to transmit the subword store flag to the global memory unit when the local copy is replaced in the local memory and the subword store flag is set to indicate the subelement size;

means for storing in the global memory a write bitmask having a plurality of bits associated one-to-one with subelements of the data elements of the data block; and means for merging in the global memory the local copy and the data block when the subword store flag is set to indicate the subelement size by storing each subelement of a data element in the local copy that differs from a corresponding, as yet unmodified subelement of the data block, and by setting each bit of the write bitmask associated with each such stored subelement to the written value.

13. The computer system of claim 11, wherein the global memory controller is further operative to identify the occurrence of a write/write data race where multiple processing units concurrently accessing data in a same data block send write bitmasks having flags associated with data elements in corresponding positions of their respective local copies that are both set to the written value.

14. The computer system of claim 13, further comprising:

means for storing a read bitmask in the local memory, the read bitmask comprising a plurality of flags associated in a one-to-one relationship with the data elements of the local copy, the flags of the read bitmask initially being set to a not read value; and means for setting a flag of the read bitmask associated with a data element read by the processor to a read value.

15. The computer system of claim 14, further comprising:

the local memory controller being operative to send the read bitmask to the global memory unit when the local copy is replaced in the local memory;

the global memory controller being operative to identify the occurrence of a read/write data race condition where, between synchronization points, processing units accessing data in one data block sends a read bitmask and another processing unit accessing data in the same data block sends a write bitmask, and the bitmasks have bits associated with data elements in corresponding positions of their respective local copies set to the read and written values, respectively.

16. The computer system of claim 11, further comprising:

means for storing a plurality of lock flags in the global memory associated in a one-to-one relationship with the data blocks, the lock flags being initially set to an unlocked value;

means for setting the lock flag to a locked value when requested by a first processing unit;

means for storing requests by any other processing unit for access to a lock or data block associated with a lock flag that is set to the locked value in a suspended request queue;

means for resetting the lock flag to the unlocked value when requested by the first processing unit; and means for processing the requests in the suspended request queue when the lock flag is reset.

17. The computer system of claim 11, further comprising means in the global memory unit for performing a global reduction operation on a data block in response to a request from a processing unit and for storing a result of the global reduction operation in the global memory unit.

18. The computer system of claim 11, further comprising:

a plurality of global memory units, the plurality of global memory units being interconnected with the plurality of processing units;

a first global memory in a first of the global memory units storing a plurality of data blocks;

a second global memory in a second of the global memory units storing a global copy of a first of the data blocks;

a local memory in a first of the processing units storing a local copy of the global copy;

means in the second global memory unit for merging the local copy with the global copy in the second global memory when the local copy is replaced in the local memory; and means in the first global memory unit for merging the global copy with the first data block stored in the first global memory when all local copies of the global copy have been merged with the global copy.

19. The method of claim 4, wherein said subword store flag indicates that the minimum size element is a bit, said method further comprising:

maintaining a bit-modify flag for each internal register of such each processor, such that when said processor modifies less than the entire contents of said internal register, said processors sets said bit-modify flag to a value indicative of a bit level modification;

when writing from one such internal register to said local memory, checking said bit-modify flag corresponding to said one such internal register, and if said bit-modify flag is set to said value indicative of a bit level modification, said processor sets said subword store flag to indicate bit level modifications;

wherein when said subword store flag indicates a bit level merge, said merging includes creating a temporary bitmask in said global memory with a single-bit flag for each bit of the data block from an exclusive-OR of the local copy of said block and said data block, and storing, for each bit that has not previously been modified, the value of the correspondingly positioned bit in said cached copy.

* * * * *